(12) United States Patent
Mori

(10) Patent No.: US 12,460,941 B2
(45) Date of Patent: Nov. 4, 2025

(54) MAP GENERATION APPARATUS

(71) Applicant: Honda Motor Co., Ltd., Tokyo (JP)

(72) Inventor: Naoki Mori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 253 days.

(21) Appl. No.: 18/124,506

(22) Filed: Mar. 21, 2023

(65) Prior Publication Data

US 2023/0314163 A1 Oct. 5, 2023

(30) Foreign Application Priority Data

Mar. 30, 2022 (JP) .................................. 2022-056150

(51) Int. Cl.
*G01C 21/00* (2006.01)

(52) U.S. Cl.
CPC ...... *G01C 21/3811* (2020.08); *G01C 21/3837* (2020.08)

(58) Field of Classification Search
None
See application file for complete search history.

(56) References Cited

U.S. PATENT DOCUMENTS

| | | | | |
|---|---|---|---|---|
| 2009/0228204 | A1* | 9/2009 | Zavoli | G01C 21/30 701/532 |
| 2019/0026920 | A1* | 1/2019 | Yi | G01C 21/3811 |
| 2019/0206135 | A1 | 7/2019 | Jiang | |
| 2020/0109954 | A1* | 4/2020 | Li | G01C 21/3848 |
| 2020/0263994 | A1 | 8/2020 | Lee et al. | |
| 2021/0248387 | A1 | 8/2021 | Inaba et al. | |

(Continued)

FOREIGN PATENT DOCUMENTS

| | | |
|---|---|---|
| CN | 113220805 A | 8/2021 |
| CN | 113785253 A | 12/2021 |
| JP | 2016157197 A | 9/2016 |

(Continued)

OTHER PUBLICATIONS

Japanese Office action; Application 2022-056150; 8 pages; Jul. 29, 2025.

(Continued)

*Primary Examiner* — Hongye Liang
(74) *Attorney, Agent, or Firm* — Duft & Bornsen, PC

(57) ABSTRACT

A map generation apparatus includes a microprocessor configured to perform: extracting feature points from detection information detected by an in-vehicle detection unit; selecting feature points for which three-dimensional positions are to be calculated from extracted feature points; based on a plurality of the detection information, calculating the three-dimensional positions of same feature points in the plurality of the detection information for the selected feature points by using a position and posture of the in-vehicle detection unit; and generating a map including information of each of the three-dimensional positions by using the three-dimensional positions of the calculated feature points, wherein the microprocessor is configured to perform the selecting including selecting the feature points on an object with a high priority among a plurality of objects included in the detection information based on a priority information set for each of the plurality of objects in advance.

13 Claims, 7 Drawing Sheets

(56) References Cited

U.S. PATENT DOCUMENTS

2022/0207883 A1    6/2022   Watanabe et al.

FOREIGN PATENT DOCUMENTS

| | | |
|---|---|---|
| JP | 2019121136 A | 7/2019 |
| JP | 2020153956 A | 9/2020 |
| JP | 2021149396 A | 9/2021 |
| WO | 2019082670 A1 | 5/2019 |
| WO | 2020226085 A1 | 11/2020 |

OTHER PUBLICATIONS

Chinese Office action; Application 202310251537; 15 pages; Aug. 1, 2025.

* cited by examiner

MAP GENERATION APPARATUS

CROSS-REFERENCE TO RELATED APPLICATION

This application is based upon and claims the benefit of priority from Japanese Patent Application No. 2022-056150 filed on Mar. 30, 2022, the content of which are incorporated herein by reference.

BACKGROUND OF THE INVENTION

Field of the Invention

This invention relates to a map generation apparatus for generating a map used for estimating a position of a vehicle.

Description of the Related Art

As this type of device, there has been conventionally known a device configured to create an environmental map using feature points extracted from a captured image acquired by a camera mounted on a traveling vehicle (see, for example, JP 2020-153956 A).

With related art techniques, the structure of the landscape features corresponding to the feature points used to create the environmental map could change, and the map information may not match the reality.

SUMMARY OF THE INVENTION

An aspect of the present invention is a map generation apparatus including: an in-vehicle detection unit configured to detect a situation around a subject vehicle; a microprocessor and a memory coupled to the microprocessor. The microprocessor is configured to perform: extracting a plurality of feature points from detection information detected by the in-vehicle detection unit; selecting feature points for which three-dimensional positions are to be calculated from the plurality of feature points extracted in the extracting; based on a plurality of the detection information, calculating the three-dimensional positions of same feature points in the plurality of the detection information for a plurality of the feature points selected in the selecting by using a position and posture of the in-vehicle detection unit; and generating a map including information of each of the three-dimensional positions by using the three-dimensional positions of the plurality of the feature points calculated in the calculating. The microprocessor is configured to perform the selecting including selecting the feature points on an object with a high priority among a plurality of objects included in the detection information based on a priority information set for each of the plurality of objects in advance.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

An embodiment of the present invention will be described below with reference to the drawings.

A map generation apparatus according to the embodiment of the present invention can be applied to vehicles having self-driving capability, that is, self-driving vehicles. Note that the vehicle to which the map generation apparatus of the present embodiment is applied may be referred to as "subject vehicle" to distinguish it from other vehicles. The subject vehicle may be any of an engine vehicle having an internal combustion engine (engine) as a traveling drive source, an electric vehicle having a traveling motor as a traveling drive source, and a hybrid vehicle having an engine and a traveling motor as traveling drive sources. The subject vehicle can travel not only in a self-drive mode in which a driving operation by a driver is unnecessary, but also in the manual drive mode by the driving operation by the driver.

Figure 1:
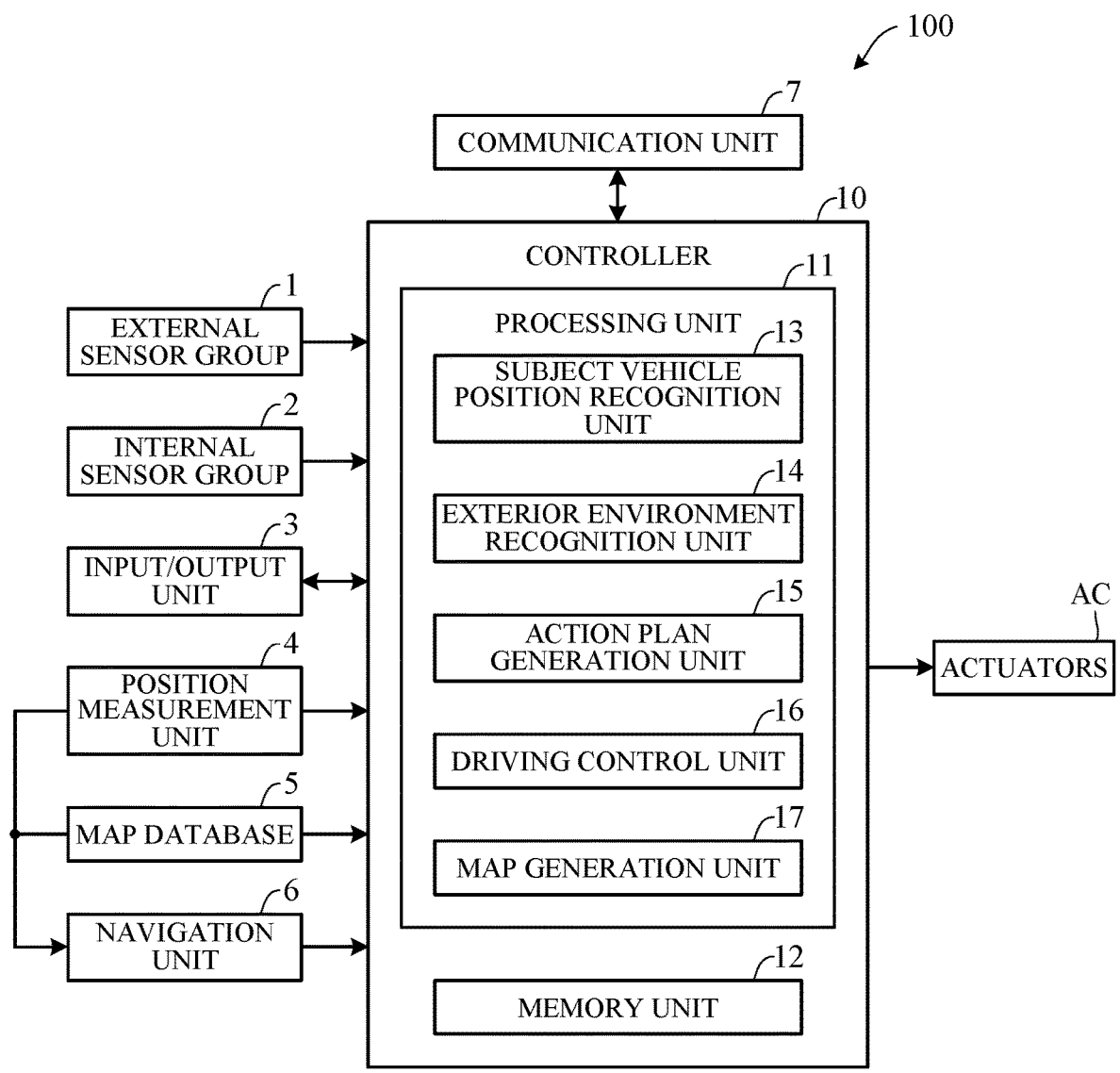
FIG. 1 is a block diagram schematically illustrating an overall configuration of a vehicle control system according to an embodiment of the present invention.

First, a schematic configuration of the subject vehicle related to self-driving will be described. FIG. 1 is a block diagram schematically illustrating an overall configuration of a vehicle control system 100 of a subject vehicle including a map generation apparatus according to the embodiment of the present invention. As illustrated in FIG. 1, the vehicle control system 100 mainly includes a controller 10, an external sensor group 1, an internal sensor group 2, an input/output device 3, a position measurement unit 4, a map database 5, a navigation unit 6, a communication unit 7, and traveling actuators AC each communicably connected to the controller 10.

The external sensor group 1 is a generic term for a plurality of sensors (external sensors) that detect an external situation which is peripheral information of the subject vehicle. For example, the external sensor group 1 includes a LiDAR that measures scattered light with respect to irradiation light in all directions of the subject vehicle and measures the distance from the subject vehicle to surrounding obstacles, a radar that detects other vehicles, obstacles, and the like around the subject vehicle by irradiating electromagnetic waves and detecting reflected waves, and a camera that is installed in the subject vehicle, has an imaging element (image sensor) such as a charge coupled device (CCD) or a complementary metal oxide semiconductor (CMOS), and captures images the surrounding (front, rear, and side) of the subject vehicle.

The internal sensor group 2 is a generic term for a plurality of sensors (internal sensors) that detect a traveling state of the subject vehicle. For example, the internal sensor group 2 includes a vehicle speed sensor that detects a vehicle speed of the subject vehicle, an acceleration sensor that detects an acceleration in a front-rear direction of the subject vehicle and an acceleration in a left-right direction (lateral acceleration) of the subject vehicle, a revolution sensor that detects the number of revolutions of the traveling drive source, and a yaw rate sensor that detects a rotation angular speed around a vertical axis of the center of gravity of the subject vehicle. The internal sensor group 2 further includes a sensor that detects a driver's driving operation in a manual drive mode, for example, operation of an accelerator pedal, operation of a brake pedal, operation of a steering wheel, and the like.

The input/output device 3 is a generic term for devices in which a command is input from a driver or information is output to the driver. For example, the input/output device 3 includes various switches to which the driver inputs various commands by operating an operation member, a microphone to which the driver inputs a command by voice, a display that provides information to the driver via a display image, and a speaker that provides information to the driver by voice.

The position measurement unit (global navigation satellite system (GNSS) unit) 4 includes a positioning sensor that receives a signal for positioning, transmitted from a positioning satellite. The positioning satellite is an artificial satellite such as a global positioning system (GPS) satellite or a quasi-zenith satellite. The position measurement unit 4 uses positioning information received by the positioning sensor to measure a current position (latitude, longitude, and altitude) of the subject vehicle.

The map database 5 is a device that stores general map information used for the navigation unit 6, and is constituted of, for example, a hard disk or a semiconductor element. The map information includes road position information, information on a road shape (curvature or the like), and position information on intersections and branch points. The map information stored in the map database 5 is different from highly accurate map information stored in a memory unit 12 of the controller 10.

The navigation unit 6 is a device that searches for a target route on a road to a destination input by a driver and provides guidance along the target route. The input of the destination and the guidance along the target route are performed via the input/output device 3. The target route is calculated based on a current position of the subject vehicle measured by the position measurement unit 4 and the map information stored in the map database 5. The current position of the subject vehicle can be measured using the detection values of the external sensor group 1, and the target route may be calculated on the basis of the current position and the highly accurate map information stored in the memory unit 12.

The communication unit 7 communicates with various servers not illustrated via a network including wireless communication networks represented by the Internet, a mobile telephone network, and the like, and acquires the map information, travel history information, traffic information, and the like from the servers periodically or at an arbitrary timing. The travel history information of the subject vehicle may be transmitted to the server via the communication unit 7 in addition to the acquisition of the travel history information. The network includes not only a public wireless communication network but also a closed communication network provided for each predetermined management region, for example, a wireless LAN, Wi-Fi (registered trademark), Bluetooth (registered trademark), and the like. The acquired map information is output to the map database 5 and the memory unit 12, and the map information is updated.

The actuators AC is traveling actuators for controlling traveling of the subject vehicle. In a case where the traveling drive source is an engine, the actuators AC includes a throttle actuator that adjusts an opening (throttle opening) of a throttle valve of the engine. In a case where the traveling drive source is a traveling motor, the traveling motor is included in the actuators AC. The actuators AC also includes a brake actuator that operates a braking device of the subject vehicle and a steering actuator that drives a steering device.

The controller 10 includes an electronic control unit (ECU). More specifically, the controller 10 includes a computer including a processing unit 11 such as a CPU (microprocessor), the memory unit 12 such as a ROM and a RAM, and other peripheral circuits (not illustrated) such as an I/O interface. Although a plurality of ECUs having different functions such as an engine control ECU, a traveling motor control ECU, and a braking device ECU can be separately provided, in FIG. 1, the controller 10 is illustrated as a set of these ECUs for convenience.

The memory unit 12 stores highly accurate detailed map information (referred to as high-precision map information). The high-precision map information includes information on the position of roads, road geometry (curvature and others), road gradients, positions of intersections and junctions, types and positions of road division lines such as white lines, number of lanes, lane width and position of each lane (center position of lanes and boundaries of lane positions), positions of landmarks (buildings, traffic lights, signs, and others) on maps, and road surface profiles such as road surface irregularities. In the embodiment, center lines, lane lines, outside lines, and the like are collectively referred to as road division lines.

The high-precision map information stored in the memory unit 12 includes map information (referred to as external map information) acquired from the outside of the subject vehicle via the communication unit 7 and a map (referred to as internal map information) created by the subject vehicle itself using detection values by the external sensor group 1 or detection values of the external sensor group 1 and the internal sensor group 2.

The external map information is, for example, information of a map acquired via a cloud server (referred to as a cloud map), and the internal map information is, for example, information of a map (referred to as an environmental map) including three-dimensional point cloud data generated by mapping using a technology such as simultaneous localization and mapping (SLAM). The external map information is shared between the subject vehicle and other vehicles, whereas the internal map information is map information that is exclusive to the subject vehicle (for example, map information that only the subject vehicle owns). On roads not yet traveled by the subject vehicle, newly constructed roads, and the like, environmental maps are created by the subject vehicle itself. Note that the internal map information may be provided to a server device or other vehicles via the communication unit 7.

In addition to the above-described high-precision map information, the memory unit 12 also stores traveling trajectory information of the subject vehicle, various control programs, and thresholds used in the programs.

The processing unit 11 includes a subject vehicle position recognition unit 13, an exterior environment recognition unit 14, an action plan generation unit 15, a driving control unit 16, and a map generation unit 17 as functional configurations.

The subject vehicle position recognition unit 13 recognizes (or estimates) the position (subject vehicle position) of the subject vehicle on a map, based on the position information of the subject vehicle, obtained by the position measurement unit 4, and the map information of the map database 5.

The subject vehicle position may be recognized (estimated) using the high-precision map information stored in the memory unit 12 and the peripheral information of the subject vehicle detected by the external sensor group 1, whereby the subject vehicle position can be recognized with high accuracy.

The movement information (moving direction, moving distance) of the subject vehicle may be calculated based on the detection values by the internal sensor group 2, and the subject vehicle position may be recognized accordingly. When the subject vehicle position can be measured by a sensor installed on a road or outside a road side, the subject vehicle position can be recognized by communicating with the sensor via the communication unit 7.

The exterior environment recognition unit 14 recognizes an external situation around the subject vehicle, based on the signal from the external sensor group 1 such as a LiDAR, a radar, and a camera. For example, the position, speed, and acceleration of a surrounding vehicle (a forward vehicle or a rearward vehicle) traveling around the subject vehicle, the position of a surrounding vehicle stopped or parked around the subject vehicle, the positions and states of other objects, and the like are recognized. Other objects include signs, traffic lights, markings such as division lines and stop lines of roads, buildings, guardrails, utility poles, signboards, pedestrians, bicycles, and the like. The states of other objects include a color of a traffic light (red, green, yellow), and the moving speed and direction of a pedestrian or a bicycle. A part of the stationary object among the other objects constitutes a landmark serving as an index of the position on the map, and the exterior environment recognition unit 14 also recognizes the position and type of the landmark.

The action plan generation unit 15 generates a driving path (target path) of the subject vehicle from a current point of time to a predetermined time ahead based on, for example, the target route calculated by the navigation unit 6, the high-precision map information stored in the memory unit 12, the subject vehicle position recognized by the subject vehicle position recognition unit 13, and the external situation recognized by the exterior environment recognition unit 14. When there is a plurality of paths that are candidates for the target path on the target route, the action plan generation unit 15 selects, from among the plurality of paths, an optimal path that satisfies criteria such as compliance with laws and regulations, and efficient and safe traveling, and sets the selected path as the target path. Then, the action plan generation unit 15 generates an action plan corresponding to the generated target path. The action plan generation unit 15 generates various action plans corresponding to overtaking to pass a preceding vehicle, changing lanes to change traveling lanes, following a preceding vehicle, lane keeping to maintain the lane without deviating from the traveling lane, decelerating or accelerating, and the like. When the action plan generation unit 15 generates the target path, the action plan generation unit 15 first determines a travel mode, and generates the target path based on the travel mode.

In the self-drive mode, the driving control unit 16 controls each of the actuators AC such that the subject vehicle travels along the target path generated by the action plan generation unit 15. More specifically, the driving control unit 16 calculates a requested driving force for obtaining the target acceleration for each unit time calculated by the action plan generation unit 15 in consideration of travel resistance determined by a road gradient or the like in the self-drive mode. Then, for example, the actuators AC are feedback controlled so that an actual acceleration detected by the internal sensor group 2 becomes the target acceleration. More specifically, the actuators AC are controlled so that the subject vehicle travels at the target vehicle speed and the target acceleration. In the manual drive mode, the driving control unit 16 controls each of the actuators AC in accordance with a traveling command (steering operation or the like) from the driver, acquired by the internal sensor group 2.

The map generation unit 17 generates an environmental map of the area around the road on which the subject vehicle has traveled as internal map information using detection values detected by the external sensor group 1 during traveling in the manual drive mode. For example, an edge indicating an outline of an object is extracted from a plurality of frames of camera images acquired by the camera based on luminance and color information for each pixel, and feature points are extracted using the edge information. The feature points are, for example, intersections of edges, and correspond to corners of buildings, corners of road signs, or the like. The map generation unit 17 calculates the three-dimensional position for the feature point while estimating the position and posture of the camera so that the same feature point converges to a single point among a plurality of frames of camera images according to the algorithm of the SLAM technology. By performing this calculation processing for each of the plurality of feature points, an environmental map including the three-dimensional point cloud data is generated.

Note that the environmental map may be generated by extracting feature points of objects around the subject vehicle using data acquired by a radar or LiDAR instead of a camera.

In addition, when generating an environmental map, if the map generation unit 17 determines by pattern matching processing or other means that a predetermined landscape feature (for example, a road division line, traffic light, sign, or the like) having a feature point that was not used to calculate the above-described three-dimensional position is included in camera images, it adds the position information of the point corresponding to the feature point of the landscape feature based on the camera images to the environmental map and records it in the memory unit 12.

The subject vehicle position recognition unit 13 performs subject vehicle position recognition processing in parallel with map creation processing by the map generation unit 17. That is, the position of the subject vehicle is estimated on the basis of a change in the position of the feature point over time. The map creation processing and the position recognition processing (position estimation processing) are simultaneously performed, for example, according to the algorithm of the SLAM technology. The map generation unit 17 can generate the environmental map not only when the vehicle travels in the manual drive mode but also when the vehicle travels in the self-drive mode. In a case where an environmental map has already been generated and stored in the memory unit 12, the map generation unit 17 may update the environmental map based on newly extracted feature points (which may be referred to as new feature points) from the newly acquired camera images.

By the way, when the subject vehicle position is estimated using the information of the environmental map generated using the SLAM technology, if there is a time lag (for example, 2 or 3 months, half a year or 1 year) between the generation of the environmental map and estimation of the subject vehicle position, the environmental structure (for example, structures of roads and landscape features around roads) may have changed due to road construction, new construction, reconstruction or demolition of buildings around roads, seasonal changes in roadside trees, and other factors.

As a result, the feature points constituting the environmental map no longer match the feature points extracted from the camera images at the time of estimating the subject vehicle position, making it difficult to correctly estimate the subject vehicle position.

In the embodiment, before the same feature points are tracked across a plurality of frames of camera images according to the algorithm of the SLAM technology and the three-dimensional positions for the feature points are calculated, feature points that are less susceptible to environmental changes are selected. Furthermore, the information on the feature points constituting the environmental map is updated according to changes in the environment after the environmental map is generated.

The map generation apparatus that executes the above processing will be described in more detail.

Figure 2:
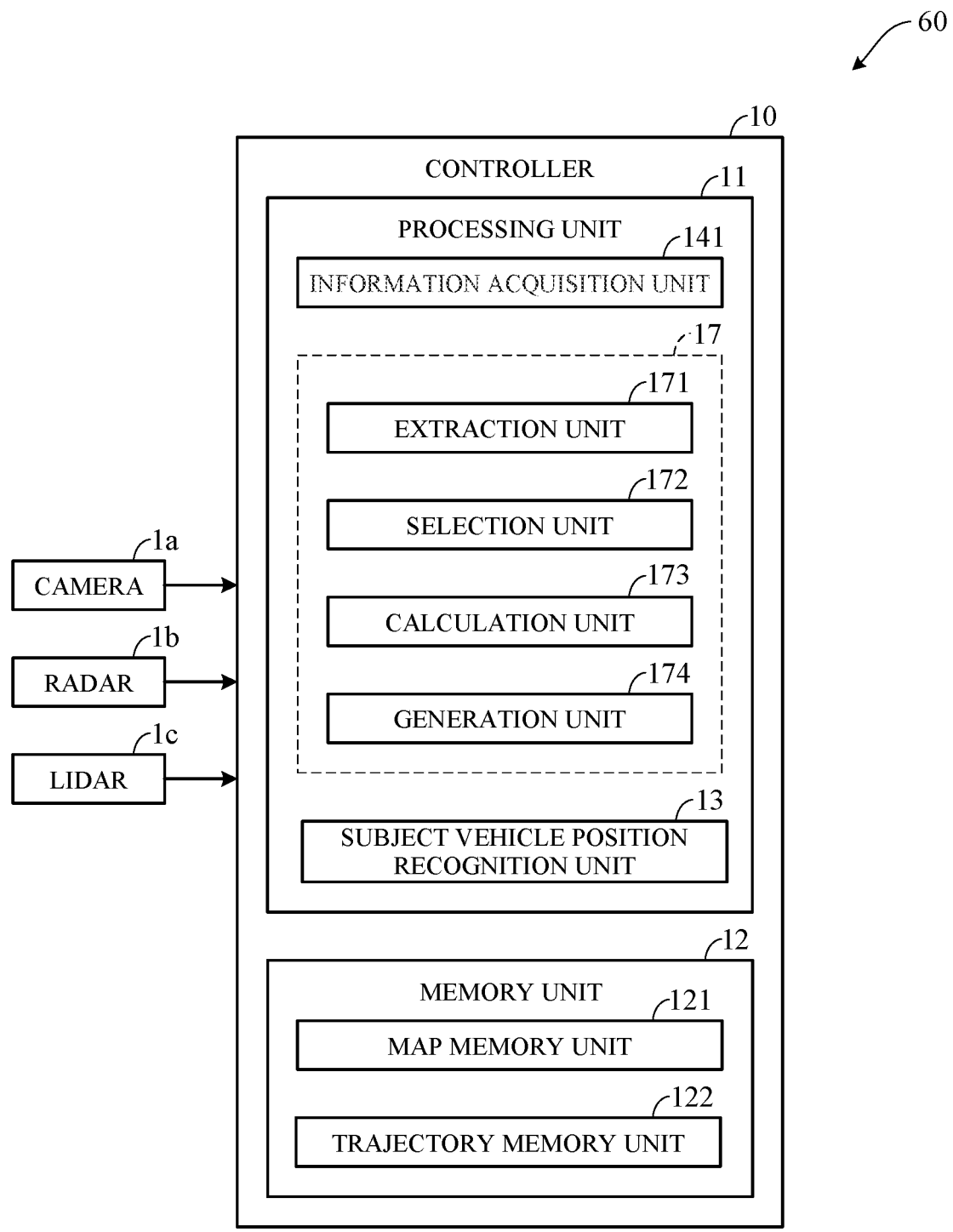
FIG. 2 is a block diagram illustrating a main configuration of a map generation apparatus according to the embodiment of the present invention.

FIG. 2 is a block diagram illustrating a main configuration of a map generation apparatus 60 according to the present embodiment. This map generation apparatus 60 controls the traveling operation of the subject vehicle and constitutes a part of the vehicle control system 100 of FIG. 1. As illustrated in FIG. 2, the map generation apparatus 60 includes the controller 10, the camera 1a, a radar 1b, and a LiDAR 1c.

The camera 1a constitutes a part of the external sensor group 1 of FIG. 1. The camera 1a may be a monocular camera or a stereo camera, and captures images of the surroundings of the subject vehicle. The camera 1a is attached to, for example, a predetermined position at the front of the subject vehicle, continuously captures images of the space in front of the subject vehicle at a predetermined frame rate, and sequentially outputs frame image data (simply referred to as camera images) as detection information to the controller 10.

Figure 3A:
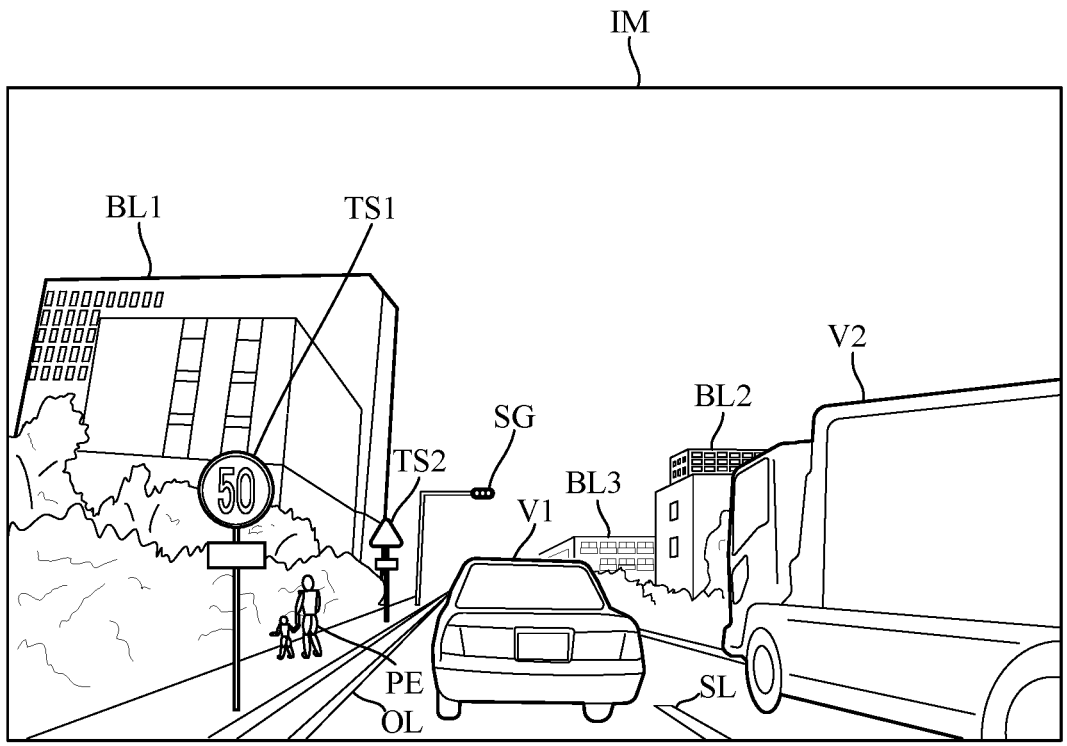
FIG. 3A is a diagram illustrating an example of a camera image.

FIG. 3A is a diagram illustrating an example of the camera image of a certain frame acquired by the camera 1a. The camera image IM includes other vehicle V1 traveling in front of the subject vehicle, other vehicle V2 traveling in the right lane of the subject vehicle, a traffic light SG around the subject vehicle, a pedestrian PE, traffic signs TS1 and TS2, buildings BL1, BL2 and BL3 around the subject vehicle, an outside line OL, and a lane line SL.

The radar 1b of FIG. 2 is mounted on the subject vehicle and detects other vehicles, obstacles, and the like around the subject vehicle by irradiating electromagnetic waves and detecting reflected waves. The radar 1b outputs detection values (detection data) as detection information to the controller 10. The LiDAR 1c is mounted on the subject vehicle, and measures scattered light with respect to irradiation light in all directions of the subject vehicle and detects a distance from the subject vehicle to surrounding vehicles and obstacles. The LiDAR 1c outputs detection values (detection data) as detection information to the controller 10.

The controller 10 includes a processing unit 11 and a memory unit 12. The processing unit 11 includes an information acquisition unit 141, an extraction unit 171, a selection unit 172, a calculation unit 173, a generation unit 174, and the subject vehicle position recognition unit 13 as functional configurations.

The information acquisition unit 141 is included in, for example, the exterior environment recognition unit 14 of FIG. 1. The extraction unit 171, the selection unit 172, the calculation unit 173, and the generation unit 174 are included in, for example, the map generation unit 17 of FIG. 1.

In addition, the memory unit 12 includes a map memory unit 121 and a trajectory memory unit 122.

The information acquisition unit 141 acquires information used for controlling the traveling operation of the subject vehicle from the memory unit 12 (map memory unit 121). In more detail, the information acquisition unit 141 reads landmark information included in the environmental map from the map memory unit 121, and further acquires, from the landmark information, information indicating the positions of division lines of the road on which the subject vehicle is traveling, and the extending directions of the division lines (hereinafter referred to as division line information).

Note that when the division line information does not include the information indicating the extending direction of the division lines, the information acquisition unit 141 may calculate the extension direction of the division lines based on the position of the division lines. Furthermore, information indicating the positions and the extending direction of division lines of the road on which the subject vehicle travels may be acquired from road map information or a white line map (information indicating the positions of division lines in white, yellow, or other color) stored in the map memory unit 121.

Figure 3B:
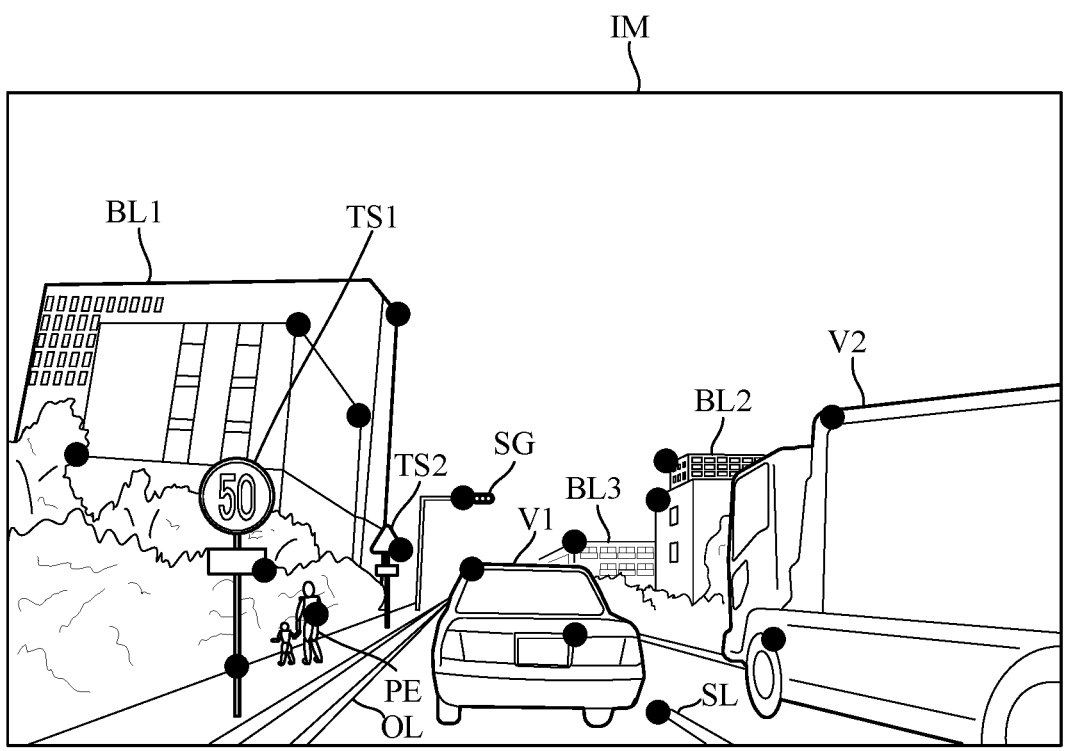
FIG. 3B is a diagram illustrating an example of extracted feature points.

The extraction unit 171 extracts edges indicating the contour of an object from the camera image IM (illustrated in FIG. 3A) acquired by the camera 1a, and also extracts feature points using the edge information. As described above, the feature points are, for example, edge intersections. FIG. 3B is a diagram illustrating feature points extracted by the extraction unit 171 based on the camera image IM of FIG. 3A. Black circles in the drawing represent feature points.

The selection unit 172 selects feature points for calculating the three-dimensional position from among the feature points extracted by the extraction unit 171. In the embodiment, unique feature points that are easily distinguishable from other feature points are selected.

First, the selection unit 172 executes segmentation of the camera image IM into regions for each object in the camera image IM using machine learning (for example, deep neural network (DNN)) technology. For example, the camera image IM is classified into (1) road, (2) other vehicles, (3) pedestrians, (4) construction signs, or the like (for example, signs and pylons), (5) traffic signs/traffic lights, (6) guardrails/fences, (7) buildings, (8) street trees/plantings, (9) clouds, and (10) sky regions. Note that the camera image IM illustrated in FIG. 3A illustrates some of these objects.

In the embodiment, a ranking indicating the ease of change over time is predetermined for objects in each of the 10 regions illustrated above. For example, (2) other vehicles, (3) pedestrians, (4) construction signs or the like (for example, signs and pylons) and (9) clouds are ranked first in terms of ease of change over time because they tend to change over a short period. The same applies to (10) sky.

Next, (8) street trees/plantings are ranked second in terms of ease of change over time, since they tend to change with the seasons (for example, three months).

And (1) roads, (5) traffic signs/traffic lights, (6) guardrails/fences, and (7) buildings are ranked third in terms of ease of change over time because they are less likely to change than other objects.

When selecting feature points for calculating the three-dimensional position from among the feature points extracted by the extraction unit 171, the selection unit 172 preferentially selects feature points included in the region of the object that is less likely to change (ranked third above) among the above classified regions. Therefore, a high priority is set for feature points based on edge information of (1) roads, (5) traffic signs/traffic lights, (6) guardrails/fences, and (7) buildings, which are selected before other feature points.

For feature points based on edge information of (8) street trees/plantings that change seasonally, the selection unit 172 selects feature points based on edge information of the above-described object that is less likely to change as the next target for selection at the time of map creation and for a predetermined period (for example, three months) from the time of map creation. Therefore, feature points based on edge information of (8) street trees/plantings are set to a medium priority (between the above-described high priority and the below-described low priority) and selected after feature points based on edge information of (1) roads, (5) traffic signs/traffic lights, (6) guardrails/fences, and (7) buildings.

The selection unit 172 lowers the priority of selection for the feature point based on edge information of (8) street trees/plantings after the season has changed so as not to substantially select this feature point. This is because after the seasons change, the appearance of plants is likely to have changed due to plant growth or defoliation. Furthermore, the selection unit 172 does not select feature points included in the region of the object (ranked first in the above ranking) that is likely to change over time. Therefore, a low priority is set for feature points based on edge information of (2) other vehicles, (3) pedestrians, (4) construction signs or the like (for example, signs and pylons), (9) clouds, and (10) sky, which are not selected.

Note that not selecting feature points in (9) clouds and (10) sky regions is also advantageous in that feature points significantly distant from other objects are not selected. By not selecting feature points that are significantly more distant than other feature points, decrease in the calculation accuracy of the three-dimensional position can be prevented.

The calculation unit 173 calculates the three-dimensional position for the feature points while estimating the position and posture of the camera 1a so that the same feature point converges to a single point across a plurality of frames of the camera image IM. The calculation unit 173 calculates the three-dimensional positions of the plurality of different feature points selected by the selection unit 172.

The generation unit 174 uses the three-dimensional positions of the plurality of different feature points calculated by the calculation unit 173 to generate an environmental map including three-dimensional point cloud data including information of each three-dimensional position.

The subject vehicle position recognition unit 13 estimates the position of the subject vehicle on the environmental map based on the environmental map stored in the map memory unit 121.

First, the subject vehicle position recognition unit 13 estimates the position of the subject vehicle in the vehicle width direction. Specifically, the subject vehicle position recognition unit 13 recognizes the road division lines included in the camera image IM newly acquired by the camera 1a using a machine learning technique. The subject vehicle position recognition unit 13 recognizes the position and the extending direction of the division lines included in the camera image IM on the environmental map based on the division line information acquired from the landmark information included in the environmental map stored in the map memory unit 121. Then, the subject vehicle position recognition unit 13 estimates the relative positional relationship (positional relationship on the environmental map) between the subject vehicle and the division line in the vehicle width direction based on the position and the extending direction of the division line on the environmental map. In this manner, the position of the subject vehicle in the vehicle width direction on the environmental map is estimated.

Next, the subject vehicle position recognition unit 13 estimates the position of the subject vehicle in the traveling direction. Specifically, the subject vehicle position recognition unit 13 recognizes a landmark (for example, the building BL1) from the camera image IM (FIG. 3A) newly acquired by the camera 1a by processing such as pattern matching, and also recognizes feature points on that landmark from among feature points extracted by the extraction unit 171. Furthermore, the subject vehicle position recognition unit 13 estimates the distance in the traveling direction from the subject vehicle to the landmark based on the position of the feature point of the landmark appearing in the camera image IM. Note that the distance from the subject vehicle to the landmark may be calculated on the basis of the detection value of the radar 1b or the LiDAR 1c.

The subject vehicle position recognition unit 13 searches for the feature points corresponding to the above landmark in the environmental map stored in the map memory unit 121. In other words, the feature point matching the feature point of the landmark recognized from the newly acquired camera image IM is recognized from among the plurality of feature points (point cloud data) constituting the environmental map.

Next, the subject vehicle position recognition unit 13 estimates the position of the subject vehicle in the traveling direction on the environmental map based on the position of the feature point on the environmental map corresponding to the feature point of the landmark and the distance from the subject vehicle to the landmark in the traveling direction.

As described above, the subject vehicle position recognition unit 13 recognizes the position of the subject vehicle on the environmental map based on the estimated position of the subject vehicle on the environmental map in the vehicle width direction and the traveling direction.

The map memory unit 121 stores the information of the environmental map generated by the generation unit 174.

The trajectory memory unit 122 stores information indicating the traveling trajectory of the subject vehicle. The traveling trajectory is represented, for example, as the subject vehicle position on the environmental map, which is recognized by the subject vehicle position recognition unit 13 during traveling.

<Description of Flowchart>

Figure 4A:
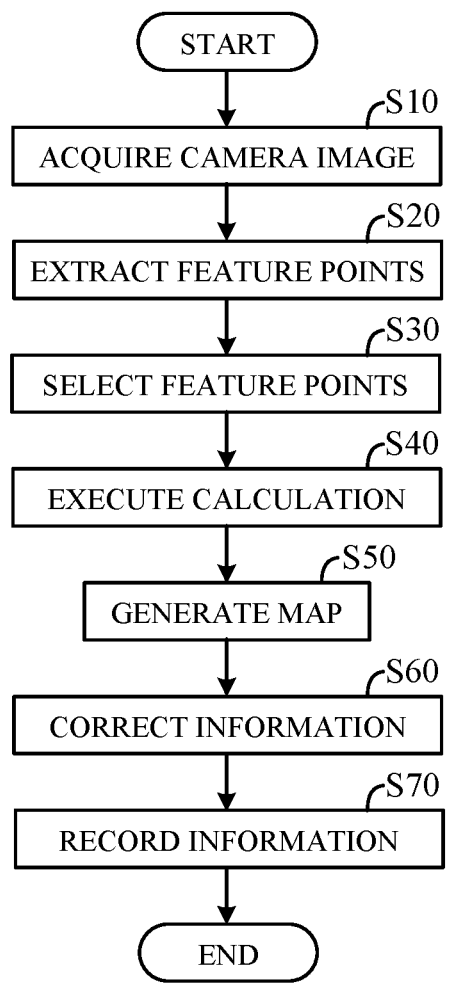
FIG. 4A is a flowchart illustrating an example of processing by a program executed by a controller.
Figure 4B:
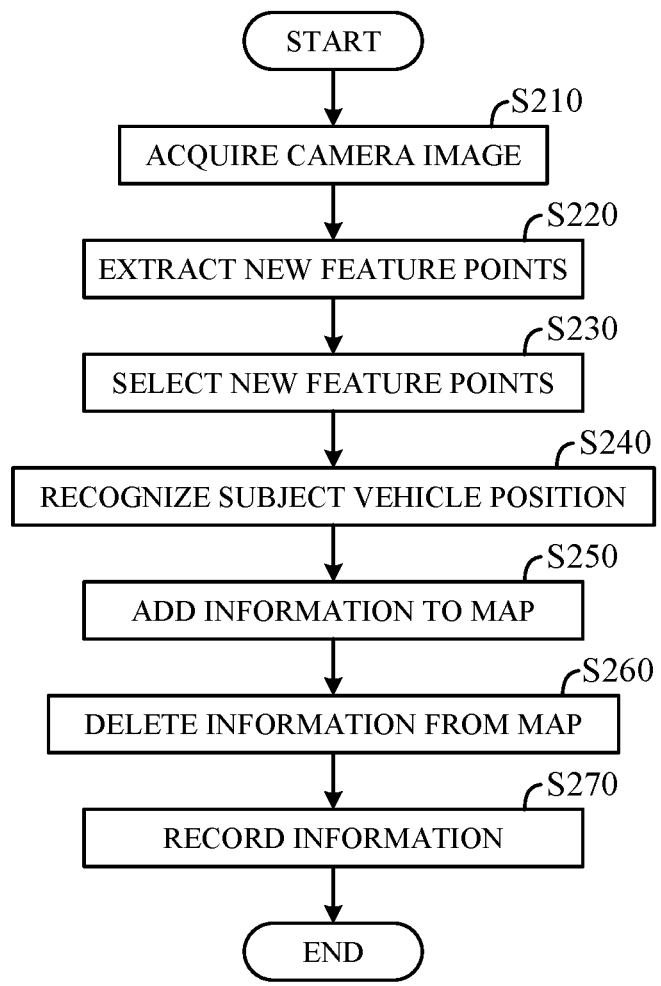
FIG. 4B is a flowchart illustrating an example of processing by the program executed by the controller.
Figure 4C:
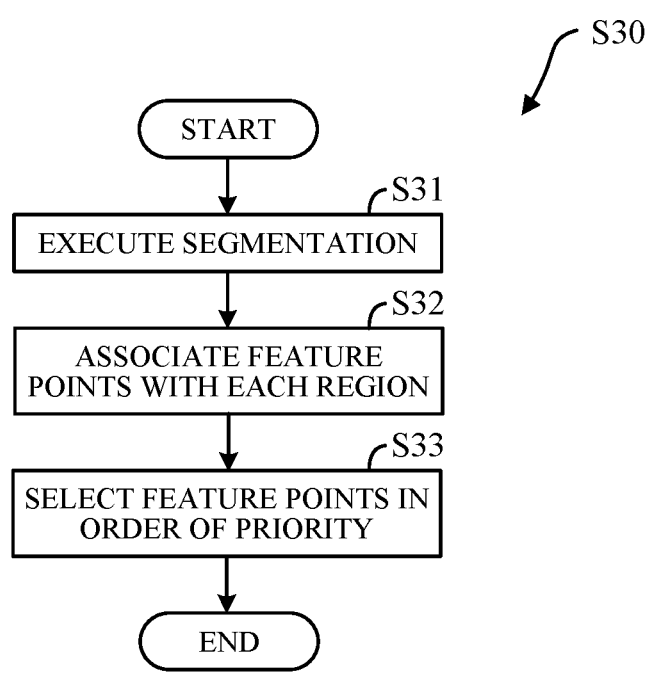
FIG. 4C is a flowchart illustrating the details of step S30 of FIG. 4A
Figure 4D:
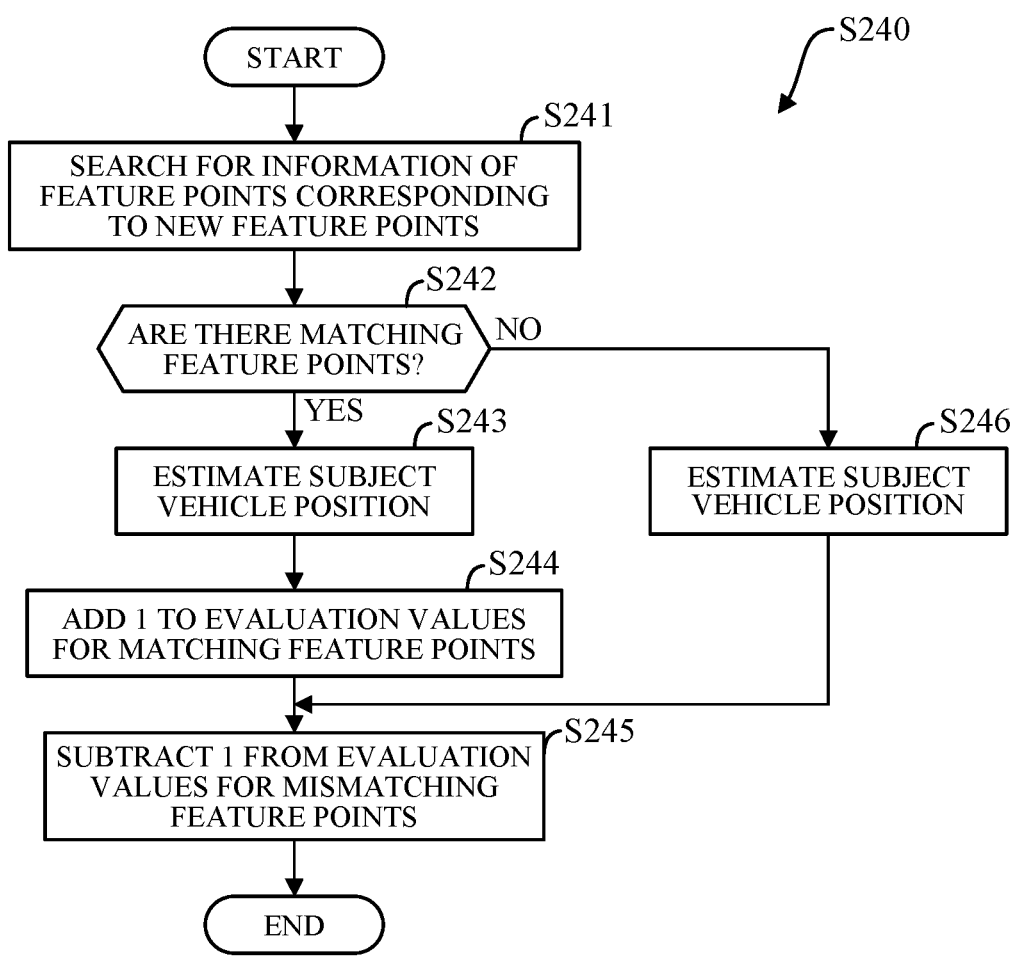
FIG. 4D is a flowchart illustrating the details of step S240 of FIG. 4B.

An example of processing executed by the controller 10 of FIG. 2 according to a predetermined program will be described with reference to flowcharts of FIGS. 4A and 4B. FIG. 4A illustrates processing before the environmental map is created, which is started in, for example, the manual drive mode and repeated at a predetermined cycle. FIG. 4B illustrates processing executed in parallel with the map creation processing of FIG. 4A. In addition, FIG. 4B is started in, for example, in the self-drive mode after the environmental map is created, which is repeated at a predetermined cycle. FIG. 4C illustrates the details of step S30 of FIG. 4A. FIG. 4D illustrates the details of step S240 of FIG. 4B.

In step S10 of FIG. 4A, the controller 10 acquires the camera image IM as detection information from the camera 1a, and processing proceeds to step S20.

In step S20, the controller 10 extracts feature points from the camera image IM by the extraction unit 171, and processing proceeds to step S30.

In step S30, the controller 10 selects feature points by the selection unit 172 in the following procedure.

In step S31 of FIG. 4C, the selection unit 172 executes segmentation of the camera image IM into regions for each object in the camera image IM, and processing proceeds to step S32.

In step S32, the selection unit 172 associates the feature points extracted by the extraction unit 171 with each region, and processing proceeds to step S33.

In step S33, the selection unit 172 selects feature points in the order of priority for feature points in each of the 10 types of regions and ends the processing according to FIG. 4C.

The above selection processing makes it possible to preferentially select feature points based on edge information of objects that are less likely to change over time.

In step S40, the controller 10 causes the calculation unit 173 to calculate each of the three-dimensional positions of a plurality of different feature points, and proceeds to step S50.

In step S50, the controller 10 causes the generation unit 174 to generate an environmental map including three-dimensional point cloud data including information of the respective three-dimensional positions of the plurality of different feature points, and proceeds to step S60.

In step S60, if the controller 10 recognizes that the traveling position of the subject vehicle is on the past traveling trajectory, the controller 10 corrects the information of the three-dimensional position included in the environmental map by loop closing processing, and proceeds to step S70.

The loop closing processing is briefly described below. Generally, the SLAM technique accumulates errors because the subject vehicle position is recognized while the subject vehicle is moving. For example, when the subject vehicle travels around a looped road such as a ring road, the positions of the start and end points do not match due to accumulated errors. Therefore, when it is recognized that the traveling position of the subject vehicle is on the past traveling trajectory, loop closing processing is executed to make the coordinates of the subject vehicle position recognized using feature points extracted from the camera image newly acquired (referred to as new feature points) at the same traveling point as in the past and the position of the subject vehicle recognized in the past using feature points extracted from the camera image acquired at the past traveling time the same coordinates.

In step S70, the controller 10 causes the map memory unit 121 of the memory unit 12 to record the information of the environmental map, and ends the processing according to FIG. 4A.

In step S210 of FIG. 4B, the controller 10 acquires the camera image IM as detection information from the camera 1a, and proceeds to step S220.

In step S220, the controller 10 extracts new feature points from the camera image IM by the extraction unit 171, and processing proceeds to step S230. Note that the feature points extracted in the processing of FIG. 4B are referred to as new feature points even if they are points on the same object as the feature points extracted in the processing of FIG. 4A.

In step S230, the controller 10 causes the selection unit 172 to extract new feature points, and proceeds to step S240. In step S230, in the same manner as in step S30, new feature points based on edge information of objects that are less likely to change over time are preferentially selected.

In step S240, the controller 10 causes the subject vehicle position recognition unit 13 to recognize (estimate) the subject vehicle position based on the environmental map in the following procedure.

In step S241 of FIG. 4D, the controller 10 causes the subject vehicle position recognition unit 13 to search for information of the feature points corresponding to the new feature points selected by the selection unit 172 among the plurality of feature points (point cloud data) constituting the environmental map stored in the map memory unit 121 of the memory unit 12, and proceeds to step S242.

In step S242, if there are matching feature points in the environmental map, in other words, if there are feature points corresponding to the new feature points among the plurality of feature points constituting the environmental map, the subject vehicle position recognition unit 13 makes a positive judgment in step S242 and proceeds to step S243. If there are no matching feature points in the environmental map, in other words, if there are no feature points corresponding to the new feature points among the plurality of feature points constituting the environmental map, the controller 10 makes a negative judgement in step S242 and proceeds to step S246.

In step S243, the subject vehicle position recognition unit 13 recognizes (estimates) the subject vehicle position on the environmental map based on the matching feature points, and proceeds to step S244.

In step S244, the controller 10 adds 1 to the evaluation values for the feature points that matched in the processing of step S241, in other words, the feature points corresponding to the new feature points in the environmental map, and proceeds to step S245. The evaluation values are recorded in the map memory unit 121 as a part of the information of the environmental map.

In the embodiment, 1 is added to the evaluation value for the feature point in the environmental map that matched when recognizing (estimating) the subject vehicle position. On the other hand, 1 is subtracted from the evaluation values for the feature points that do not match when recognizing (estimating) the subject vehicle position. When the evaluation value becomes 0 and a predetermined period has elapsed, the controller 10 deletes the information on the feature point corresponding to that evaluation value from the environmental map. Feature points in the environmental map that have been matched many times at the time of recognition (estimation) of the subject vehicle position will have a larger evaluation value, so even if the point is not matched for a while, the information can remain in the environmental map until the evaluation value becomes zero and a predetermined period of time has elapsed.

In step S245, the controller 10 subtracts 1 from the evaluation values for the feature points that do not match in the processing of step S241, in other words, feature points that do not correspond to the new feature points in the environmental map, and ends the processing of FIG. 4D. The minimum value of the evaluation value is set to zero.

In step S246 after the negative judgment in step S242, the subject vehicle position recognition unit 13 recognizes (estimates) the subject vehicle position on the environmental map based on the position information of the new feature points, and proceeds to step S245. The position information of the new feature points is acquired, for example, by estimating the distance from the subject vehicle to the object based on the position of the object appearing in the camera image IM. Note that the distance from the subject vehicle to the object may be acquired based on the detection values by the radar 1b or the LiDAR 1c.

In step S250 of FIG. 4B, the controller 10 adds information to the environmental map. The controller 10 adds the information of the new feature point corresponding to the position information of the subject vehicle on the environmental map estimated in step S246 (FIG. 4D) to the environmental map, and proceeds to step S260.

With this configuration, information of new feature points of new landmarks or the like that have come to exist due to changes in the road environment can be incorporated into the environmental map.

Note that the controller 10 sets the evaluation value for the added feature point to 1 (initial value). In the embodiment, 1 is set for feature points that record information for the first time in the environmental map.

In step S260, the controller 10 deletes information from the environmental map. The controller 10 deletes information of, among the plurality of feature points constituting the environmental map, for example, the feature points whose evaluation value of 0 has continued for a predetermined period (for example, six months) from the environmental map. With this configuration, information of feature points of former landmarks or the like that no longer exist due to changes in the road environment can be excluded from the environmental map.

In step S270, the information of the environmental map after the update according to steps S250 and S260 is recorded in the map memory unit 121, and the processing according to FIG. 4B is ended.

According to the above-described embodiment, the following effects can be achieved.

(1) A map generation apparatus 60 includes: an extraction unit 171 that extracts feature points from a camera image IM as detection information detected by a camera 1a as an in-vehicle detection unit configured to detect a situation around a subject vehicle; a selection unit 172 that selects feature points to be used for calculation by the calculation unit 173 from a plurality of feature points extracted by the extraction unit 171; a calculation unit 173 that calculates, based on a plurality of frames of the camera images IM, three-dimensional positions of the same feature points in the plurality of frames of the camera images IM using the position and posture of the camera 1a for a plurality of different feature points selected by the selection unit 172; and a generation unit 174 that generates an environmental map including information of each three dimensional position using the three-dimensional positions of the plurality of different feature points calculated by the calculation unit 173, in which the selection unit 172 selects feature points on an object with a high priority among the plurality of objects included in the camera images IM based on the priority information set for each object in advance.

With this configuration, information of objects useful for recognizing (estimating) the position of the subject vehicle can be included in the environmental map while reducing the number of feature points used to generate the environmental map by preferentially selecting feature points of predetermined objects with a high priority (for example, roads and traffic signs) and avoiding selecting feature points of predetermined objects with a low priority (for example, other vehicles).

In this manner, environmental maps necessary for safe vehicle control can be generated.

(2) In (1) above, the priority information is set higher for objects that are less likely to change over time.

With this configuration, even if time elapses after the environmental map is generated, it is more likely that information on objects useful for recognizing (estimating) the position of the subject vehicle will remain in the environmental map. That is, environmental maps including information of feature points that are less susceptible to environmental changes can be adequately generated.

(3) The map generation apparatus 60 of (1) includes a map memory unit 121 that stores the generated environmental map, and a subject vehicle position recognition unit 13 as a position estimation unit that estimates the position of the subject vehicle by matching the new feature points extracted by the extraction unit 171 from the camera image IM newly detected by the camera 1a with the feature points in the environmental map stored in the map memory unit 121. The subject vehicle position recognition unit 13 records in the environmental map the evaluation values indicating the result of the matching for the plurality of feature points in the environmental map, and the generation unit 174 deletes from the environmental map the information of the feature points whose evaluation values are less than a predetermined value among the pieces of information of the plurality of feature points in the environmental map. The subject vehicle position recognition unit 13 increases (by one increment) the evaluation value for the feature points that match the new feature points among the plurality of feature points in the environmental map, decreases (by one decrement) the evaluation value for the feature points that do not match the new feature points among the plurality of feature points in the environmental map, and deletes feature points whose evaluation values have become less than a predetermined value or, more specifically, feature points whose evaluation values have remained less than a predetermined value for a predetermined period from the map.

With this configuration, information on objects that are unnecessary for recognizing (estimating) the subject vehicle position can be excluded from the environmental map. For example, information of feature points of former landmarks or the like that existed when the environmental map was generated but no longer exist due to environmental changes can be excluded from the environmental map.

(4) The map generation apparatus 60 of (1) includes: a map memory unit 121 that stores the generated environmental map; and a subject vehicle position recognition unit 13 as a position estimation unit that estimates the position of the subject vehicle by matching the new feature points extracted by the extraction unit 171 from the camera image IM newly detected by the camera 1a with the feature points in the environmental map stored in the map memory unit 121, in which, in a case where the information matching the new feature points is not included in the environmental map, the generation unit 174 adds the information of the feature points corresponding to the new feature points to the environmental map.

With this configuration, information of objects useful for recognizing (estimating) the subject vehicle position can be added to the environmental map at a later time. For example, information of new feature points of new landmarks or the like that did not exist at the time the environmental map was generated, but have come to exist due to changes in the road environment, can be incorporated into the environmental map.

The above embodiment may be modified into various embodiments.

Hereinafter, modifications will be described.

First Modification

Although an example in which the selection unit 172 divides the camera image IM into regions for each 10 types of objects by segmentation has been described, the types of objects are examples and may be appropriately modified. In addition, although an example was described in which the priority level for feature points on the objects selected by the selection unit 172 is divided into three levels (high, medium, and low) according to the type of objects including the feature points, the priority level may be further subdivided into more detailed levels.

Second Modification

In the embodiment, for easy understanding, the processing illustrated in FIG. 4A has been described as the processing before the environmental map is created for convenience. However, even after the environmental map is created, the processing illustrated in FIG. 4A may be executed in parallel with the subject vehicle position recognition processing of FIG. 4B. By executing the processing after the environmental map is completed, for example, when there are changes in the road environment, the information can be appropriately reflected in the environmental map.

The above embodiment can be combined as desired with one or more of the above modifications. The modifications can also be combined with one another.

The present invention allows adequate generation of maps that are less susceptible to environmental changes.

Above, while the present invention has been described with reference to the preferred embodiments thereof, it will be understood, by those skilled in the art, that various changes and modifications may be made thereto without departing from the scope of the appended claims.

What is claimed is:

1. A vehicle control system comprising:
   a camera configured to capture a situation around a subject vehicle at a predetermined frame rate;
   an actuator for traveling; and
   a microprocessor and a memory coupled to the microprocessor, wherein
   the microprocessor is configured to perform:
   extracting a plurality of feature points from an image captured by the camera;
   selecting, from the plurality of feature points, a feature point corresponding to an object whose priority is equal to or higher than a predetermined degree as a target feature point for which a three-dimensional position is to be calculated, based on priority information set for each of a plurality of objects in advance, wherein the target feature point is selected from each image of a plurality of frames acquired by the camera;
   tracking the target feature point across the plurality of frames based on a position and posture of the camera;
   calculating the three-dimensional position of the target feature point using the position and posture of the camara such that the target feature point corresponding to each of the plurality of frames converges to a single point;
   generating a map including information of the three-dimensional position of the target feature point; and
   controlling the actuator so that the subject vehicle travels along a target trajectory generated based on the map, wherein
   when a plurality of feature points each corresponding to one of one or more objects whose priority is equal to or higher than the predetermined degree are present, the selecting includes selecting a plurality of the target feature points corresponding to the plurality of the feature points each corresponding to the one or more objects, the calculating includes calculating three-dimensional positions of the plurality of the target feature points, and the generating includes generating the map including information on the three-dimensional positions of the plurality of the target feature points,
   the objects include moving objects and stationary objects, and
   in the priority information, the priority is set higher for the moving objects and the stationary objects that are less likely to change over time.

2. The vehicle control system according to claim 1, wherein
   the microprocessor is configured to perform
   the selecting including selecting a feature point corresponding to an object whose priority is a medium level or higher as the target feature point, while not selecting a feature point corresponding to an object whose priority is lower than the medium level.

3. The vehicle control system according to claim 2, wherein
   the object whose priority is the medium level includes street trees and plantings,
   the object whose priority is higher than the medium level includes roads, traffic signs, traffic signals, traffic lights, guardrails, fences, and buildings, and
   the object whose priority is lower than the medium level includes other vehicles, pedestrians, construction signs, clouds, and the sky.

4. The vehicle control system according to claim 1, wherein
   the memory is configured to store the map,
   the microprocessor is configured to further perform
   when a new image is captured by the camera, extracting new feature points from the new image, and estimating a position of the subject vehicle by matching the new feature points with the plurality of the target feature points in the map stored in the memory,
   the microprocessor is configured to perform
   the estimating including recording on the map an evaluation value indicating a result of the matching in association with each of the plurality of the target feature points in the map, the evaluation value is updated every time the target feature point corresponding thereto is matched, and
   the microprocessor is configured to further perform
   deleting, from the map, target feature point when the evaluation value of the target feature point is equal to or less than a predetermined value.

5. The vehicle control system according to claim 4, wherein
   the microprocessor is configured to perform
   the estimating including increasing the evaluation value of the target feature point a that matches any of the new feature points among the plurality of the target feature points in the map, decreasing the evaluation value of the target feature point that does not match any of the new feature points among the plurality of the target feature points in the map, and deleting, from the map, the target feature point whose evaluation value falls below the predetermined value.

6. The vehicle control system according to claim 5, wherein
the microprocessor is configured to perform the deleting including deleting, from the map, the target feature point whose evaluation value remains equal to or less than the predetermined value for a predetermined period of time.

7. The vehicle control system according to claim 1, wherein
the memory is configured to store the map,
the microprocessor is configured to further perform
when a new image is captured by the camera, extracting new feature points from the new image, and estimating a position of the subject vehicle by matching the new feature points with the plurality of the target feature points in the map stored in the memory, and
the microprocessor is configured to perform
the generating including, when none of the new feature points matches any of the plurality of the target feature points included in the map, adding information on three-dimensional positions of the new feature points to the map.

8. A vehicle control system comprising:
a camera configured to capture a situation around a subject vehicle at a predetermined frame rate;
an actuator for traveling; and
a microprocessor and a memory coupled to the microprocessor, wherein
the microprocessor is configured to function as:
an extraction unit configured to extract a plurality of feature points from an image captured by the camera;
a selection unit configured to select, from the plurality of feature points, a feature point corresponding to an object whose priority is equal to or higher than a predetermined degree as a target feature point for which a three-dimensional position is to be calculate, based on priority information set for each of a plurality of objects in advance, the target feature point being selected from each image of a plurality of frames acquired by the camera, and track the target feature point across the plurality of frames based on a position and posture of the camera;
a calculation unit configured to use the position and posture of the camera to calculate the three-dimensional position of the target feature point such that the target feature point corresponding to each of the plurality of frames converges to a single point;
a generation unit configured to generate a map including information of the three-dimensional position of the target feature point; and
a driving control unit configured to control the actuator so that the subject vehicle travels along a target trajectory generated based on the map; wherein
when a plurality of the feature points each corresponding to one of one or more objects whose priority is equal to or higher than the predetermined degree are present, the selection unit is configured to select a plurality of the target feature points corresponding to the plurality of the feature points each corresponding to the one or more objects, the calculation unit is configured to calculate three-dimensional positions of the plurality of the target feature points, and the generation unit is configured to generate the map including information on the three-dimensional positions of the plurality of the target feature points,
the objects include moving objects and stationary objects, and
in the priority information, the priority is set higher for the moving objects and the stationary objects which are less likely to change over time.

9. The vehicle control system according to claim 8, wherein
the selection unit is configured to select a feature point corresponding to an object whose priority is a medium level or higher as the target feature point, while not selecting a feature point corresponding to an object whose priority is lower than the medium level.

10. The vehicle control system according to claim 8, wherein
the memory is configured to store the map generated by the generation unit,
the microprocessor is configured to further function as
a position estimation unit configured to, when a new image is captured by the camera, extract new feature points from the new image, and estimate a position of the subject vehicle by matching the new feature points with the plurality of the target feature points in the map stored in the memory, wherein
the position estimation unit is configured to record on the map an evaluation value indicating a result of the matching in association with each of the plurality of the target feature points in the map, the evaluation value is updated every time the target feature point corresponding thereto is matched, and
the generation unit is configured to delete, from the map, the target feature point when the evaluation value of the target feature point is equal to or less than a predetermined value.

11. The vehicle control system according to claim 10, wherein
the position estimation unit is configured to increase the evaluation value of the target feature point that matches any of the new feature points among the plurality of the target feature points in the map, decrease the evaluation value of the target feature point that does not match any of the new feature points among the plurality of the target feature points in the map, and delete, from the map, the target feature point whose evaluation value falls below the predetermined value.

12. The vehicle control system according to claim 11, wherein
the position estimation unit is configured to delete, from the map, the target feature point whose evaluation value remains equal to or less than the predetermined value for a predetermined period of time.

13. The vehicle control system according to claim 8, wherein
the memory is configured to store the map generated by the generation unit,
the microprocessor is configured to further function as
a position estimation unit configured to, when a new image is captured by the camera, extract new feature points from the new image, and estimate a position of the subject vehicle by matching the new feature points with the plurality of the target feature points in the map stored in the memory, wherein
the generation unit, when none of the new feature points matches any of the plurality of the target feature points information matching the new feature points is not included in the map, is configured to add information on three-dimensional positions of the new feature points to the map.

* * * * *